(12) United States Patent
Nakamura et al.

(10) Patent No.: US 11,880,627 B2
(45) Date of Patent: Jan. 23, 2024

(54) VIDEO SIGNAL OUTPUT DEVICE, METHOD FOR CONTROLLING VIDEO SIGNAL OUTPUT DEVICE, DISPLAY DEVICE, AND MULTI-DISPLAY SYSTEM

(71) Applicant: SONY GROUP CORPORATION, Tokyo (JP)

(72) Inventors: Naoko Nakamura, Tokyo (JP); Kazuo Yamamoto, Tokyo (JP); Kazuaki Toba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/997,906

(22) PCT Filed: Mar. 30, 2021

(86) PCT No.: PCT/JP2021/013734
§ 371 (c)(1),
(2) Date: Nov. 3, 2022

(87) PCT Pub. No.: WO2021/235112
PCT Pub. Date: Nov. 25, 2021

(65) Prior Publication Data
US 2023/0229378 A1    Jul. 20, 2023

(30) Foreign Application Priority Data
May 18, 2020  (JP) ................... 2020-086490

(51) Int. Cl.
*G06F 3/14*      (2006.01)
*H04N 21/4363*   (2011.01)
*H04N 21/485*    (2011.01)

(52) U.S. Cl.
CPC ..... *G06F 3/1446* (2013.01); *H04N 21/43635* (2013.01); *H04N 21/485* (2013.01)

(58) Field of Classification Search
CPC .. H04N 21/4316; H04N 21/47; H04N 21/482; H04N 21/4821; H04N 21/812;
(Continued)

(56) References Cited

U.S. PATENT DOCUMENTS 8,789,126 B1 *   7/2014   Nijim ............... H04N 21/41265
                                                         725/110
2019/0026061 A1  1/2019   Wang

FOREIGN PATENT DOCUMENTS

JP    2013-153410 A    8/2013
JP    2017-040790 A    2/2017
(Continued)

OTHER PUBLICATIONS

International Search Report and Written Opinion of PCT Application No. PCT/JP2021/013734, dated May 25, 2021, 08 pages of ISRWO.

*Primary Examiner* — Samira Monshi
(74) *Attorney, Agent, or Firm* — CHIP LAW GROUP

(57) ABSTRACT

Configuration of a multi-display system is facilitated by use of general television receivers (display devices). Multiple digital interface terminals to which each of multiple display devices configuring a multi-display is connected via a transmission path are provided. A video signal is output to each of the multiple digital interface terminals. Replacement of the video signals output from the signal output unit to the multiple digital interface terminals is controlled to display a correct video corresponding to each screen of the multi-display. For example, the replacement of the video signals is controlled according to a video replacement operation signal sent from any of the multiple display devices via the transmission path.

11 Claims, 14 Drawing Sheets

(58) Field of Classification Search
CPC ........... H04N 21/2665; H04N 21/2747; H04N 21/4532
See application file for complete search history.

(56) References Cited

FOREIGN PATENT DOCUMENTS

JP      2018-113654 A      7/2018
WO      2014/155508 A1    10/2014

* cited by examiner

SA→101-1, SB→101-2,
SC→101-3, SD→101-4

SA→101-2, SB→101-4,
SC→101-1, SD→101-3

VIDEO SIGNAL OUTPUT DEVICE, METHOD FOR CONTROLLING VIDEO SIGNAL OUTPUT DEVICE, DISPLAY DEVICE, AND MULTI-DISPLAY SYSTEM

CROSS REFERENCE TO RELATED APPLICATIONS

This application is a U.S. National Phase of International Patent Application No. PCT/JP2021/013734 filed on Mar. 30, 2021, which claims priority benefit of Japanese Patent Application No. JP 2020-086490 filed in the Japan Patent Office on May 18, 2020. Each of the above-referenced applications is hereby incorporated herein by reference in its entirety.

TECHNICAL FIELD

The present technique relates to a video signal output device, a method for controlling a video signal output device, a display device, and a multi-display system, and more specifically to a video signal output device and the like for supplying a video signal to each of multiple display devices configuring a multi-display.

BACKGROUND ART

It has been known from the past that a multi-display is configured by use of multiple display devices. For example, PTL 1 discloses that, in order to facilitate assembly of a multi-display, information regarding arrangement positions is stored in storage means of each of display devices configuring the multi-display. In this case, each display device needs a special design requiring, for example, special storage means and also requires additional time and effort for such prior preparation as storing the information regarding the arrangement positions in the special storage means.

CITATION LIST

Patent Literature

[PTL 1]
Japanese Patent Laid-open No. 2017-040790

SUMMARY

Technical Problem

An object of the present technique is to facilitate configuration of a multi-display system by using general television receivers (display devices).

Solution to Problem

According to a concept of the present technique, provided is a video signal output device including multiple digital interface terminals to which each of multiple display devices configuring a multi-display is connected via a transmission path, a signal output unit for outputting a video signal to each of the multiple digital interface terminals, and a control unit for controlling replacement of the video signals to be output from the signal output unit to the multiple digital interface terminals.

In the present technique, the multiple digital interface terminals to which each of the multiple display devices configuring the multi-display is connected via the transmission path is provided. The signal output unit outputs the video signal to each of the multiple digital interface terminals. The control unit controls the replacement of the video signals to be output from the signal output unit to the multiple digital interface terminals.

For example, the control unit may control the replacement according to a video replacement operation signal sent from any of the multiple display devices via the transmission path. Here, for example, the digital interface terminals may be HDMI terminals, and the video replacement operation signal may be sent via a CEC line included in the transmission path. In this case, the video replacement operation signal is generated by a video replacement operation performed by a user who can observe the video displayed on each of multiple screens of the multi-display configured by assembling the multiple display devices, and the control unit can appropriately perform the video signal replacement control such that the video displayed on each of the multiple screens of the multi-display is correct.

In this case, for example, the video signals output from the signal output unit to the multiple digital interface terminals may include display information for displaying which screen in a multi-screen each video signal corresponds to. Here, the display information is information for displaying, for example, at least any of colors, patterns, numbers, letters, symbols, and pictograms. Accordingly, a display indicating which screen in the multi-screen the video corresponds to is displayed on the video displayed on each of the multiple screens of the multi-display configured by assembling the multiple display devices, and thus the user can easily and appropriately perform the video replacement operation.

In addition, in this case, for example, at least any of the video signals output from the signal output unit to the multiple digital interface terminals may include user interface display information for the user to perform the video replacement operation. In this case, the user interface display for the user to perform the video replacement operation is displayed on at least any of the videos displayed on the respective multiple screens of the multi-display including the multiple display devices, and thus the user can easily perform the video replacement operation by referring to the user interface display.

Here, the user interface display information may be included in the video signal corresponding to a predetermined screen in the multi-screen that is among the video signals output from the signal output unit to the multiple digital interface terminals. Accordingly, the user can easily recognize that the video on which the user interface display is displayed is a video corresponding to a predetermined screen (for example, the upper left screen in the multi-screen having a 2×2 four-screen configuration) in the multi-screen.

In addition, in this case, for example, the control unit may perform control to cause the video signal corresponding to the screen configuration of the multi-display to be output from the signal output unit, according to a setting operation signal of the screen configuration of the multi-display including the multiple display devices that is sent from any of the multiple display devices via the transmission path. In this case, the setting operation signal of the screen configuration is generated by an operation performed by the user who can observe the multi-display configured by assembling the multiple display devices, and it is possible to easily and appropriately perform control to cause the video signal corresponding to the screen configuration of the multi-display to be output from the signal output unit.

For example, at least any of the video signals output from the signal output unit to the multiple digital interface terminals may include user interface display information for the user to perform a setting operation of the screen configuration of the multi-display including the multiple display devices. In this case, the user interface display for the user to perform the setting operation of the screen configuration of the multi-display including the multiple display devices is displayed on at least any of the videos displayed on the respective multiple screens of the multi-display including the multiple display devices, and thus the user can easily perform the setting operation of the screen configuration of the multi-display including the multiple display devices, by referring to the user interface display.

In this case, for example, options of the screen configuration in the user interface display information may be limited according to information regarding the number of display devices. Accordingly, the user can easily perform a selection operation of the screen configuration in the setting operation of the screen configuration of the multi-display including the multiple display devices.

As described above, in the present technique, the multiple digital interface terminals to which each of the multiple display devices configuring the multi-display is connected via the transmission path is provided, and the control unit controls the replacement of the video signals to be output from the signal output unit to the multiple digital interface terminals. Hence, a correct video corresponding to the screen can be displayed on the multiple screens of the multi-display configured by assembling the multiple display devices, and it is thus possible to facilitate configuration of a multi-display system by using general television receivers (display devices).

In addition, according to another concept of the present technique, provided is a display device including an operation signal generation unit that generates an operation signal for replacing videos displayed on screens of multiple display devices configuring a multi-display including its own display device, and a transmission unit that transmits the operation signal to a video signal output device that outputs a video signal to the multiple display devices, via a transmission path.

In the present technique, the operation signal for replacing the videos displayed on the screens of the multiple display devices configuring the multi-display including its own display device is generated. Then, the transmission unit transmits the operation signal to the video signal output device that outputs the video signal to the multiple display devices, via the transmission path. For example, the transmission path may be an HDMI cable, and the operation signal may be transmitted via a CEC line included in the transmission path. In addition, for example, the operation signal generation unit may generate the operation signal according to a user operation referring to a user interface display displayed on any of the multiple display devices.

As described above, in the present technique, the operation signal for replacing the videos displayed on the screens of the multiple display devices configuring the multi-display is generated and transmitted to the video signal output device. Hence, the video signal output device can easily and appropriately control the replacement of the video signals to be output to the multiple digital interface terminals to which each of the multiple display devices is connected via the transmission path, according to the operation signal.

In addition, according to still another concept of the present technique, provided is a multi-display system, in which a video signal output device and multiple display devices configuring a multi-display are connected to each other via a transmission path, and in which the video signal output device includes multiple digital interface terminals to which each of the multiple display devices is connected via a transmission path, a signal output unit for outputting a video signal to each of the multiple digital interface terminals, and a control unit for controlling replacement of the video signals to be output from the signal output unit to the multiple digital interface terminals.

DESCRIPTION OF EMBODIMENT

Hereinafter, a mode (hereinafter, referred to as an "embodiment") for carrying out the invention will be described.

It should be noted that the description will be given in the following order.

1. Embodiment
2. Modified example

1. Embodiment

[Configuration Example of Multi-Display System]

Figure 1:
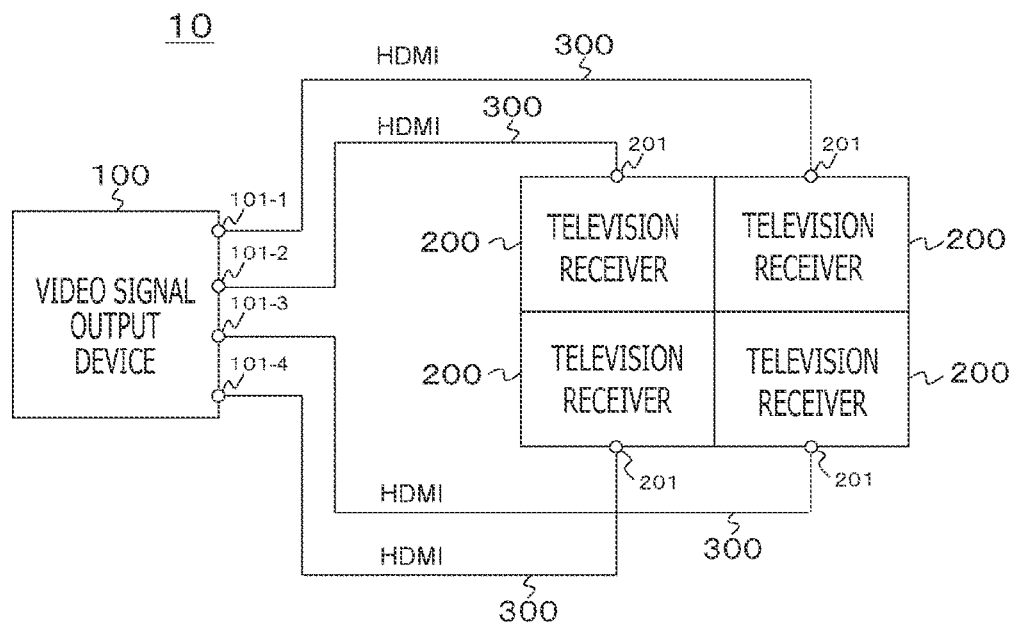
FIG. 1 is a block diagram for depicting a configuration example of a multi-display system as an embodiment.

FIG. 1 depicts a configuration example of a multi-display system 10. The multi-display system 10 has a video signal output device 100 that is a source apparatus and multiple, in this case, four, television receivers 200 that are sink apparatuses. The video signal output device 100 and each of the four television receivers 200 are connected to each other via an HDMI (High-Definition Multimedia Interface) cable 300. Here, each television receiver 200 configures a display device, and the HDMI cable 300 configures a transmission path. It should be noted that "HDMI" is a registered trademark.

The video signal output device 100 includes four HDMI output terminals (HDMI terminals) 101-1 to 101-4. In addition, each television receiver 200 includes at least one HDMI input terminal (HDMI terminal) 201. The four television receivers 200 configure a multi-display. Although the illustrated example depicts a multi-display in which the four television receivers 200 are arranged in a two-by-two matrix, it is also possible to configure a multi-display in which the four television receivers 200 are arranged in a row in a horizontal direction or a vertical direction.

Each of the four HDMI output terminals 101-1 to 101-4 of the video signal output device 100 is connected to any of the HDMI input terminals 201 of the four television receivers 200 via the HDMI cable 300. Video signals corresponding to the screen configuration of the multi-display including the four television receivers 200 are output to the four HDMI output terminals 101-1 to 101-4 of the video signal output device 100.

Here, the four television receivers 200 may be arranged at any position, and the four HDMI output terminals 101-1 to 101-4 of the video signal output device 100 may be connected to any of the HDMI input terminals 201 of the four television receivers 200. Accordingly, it is assumed that videos displayed on the screens of the multi-display including the four television receivers 200 may be different from the videos which should originally be displayed at the screen positions and that the videos are not correctly displayed on the screens of the multi-display.

In the embodiment, the video signal output device 100 can replace the video signals to be output to the four HDMI output terminals 101-1 to 101-4. Accordingly, it is possible to correctly display videos on the screens of the multi-display including the four television receivers 200.

Figure 2A:
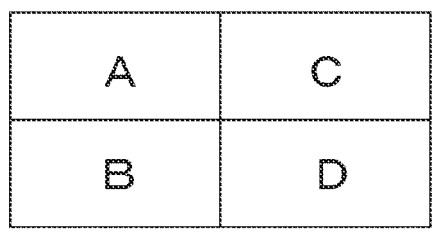
FIGS. 2A, 2B, and 2C depict diagrams each explaining replacement of video signals in a video signal output device.
Figure 2B:
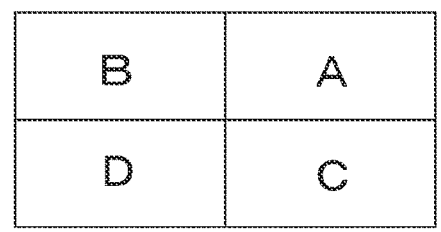

For example, FIG. 2A schematically depicts, by using the letters A, B, C, and D, videos to originally be displayed on the four screens in the multi-screen corresponding to the multi-display including the four television receivers 200 being arranged in a two-by-two matrix. In the case where video signals for displaying videos of A, B, C, and D are output to the four HDMI output terminals 101-1, 101-2, 101-3, and 101-4 of the video signal output device 100, respectively, the videos displayed on the four screens of the multi-display including the four television receivers 200 are as depicted in FIG. 2B in the case of the connection relation depicted in FIG. 1. In this case, the video arrangement is different from the video arrangement that is to originally be displayed as depicted in FIG. 2A.

Figure 2C:
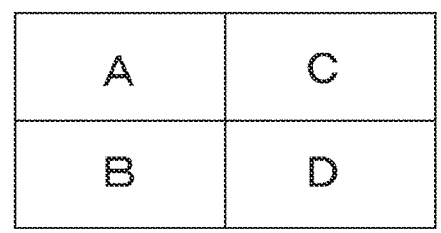

In this case, replacing the video signals such that the video signals for displaying the videos of C, A, D, and B are output to the four HDMI output terminals 101-1, 101-2, 101-3, and 101-4 of the video signal output device 100, respectively, results in the videos displayed on the four screens of the multi-display including the four television receivers 200 to be as depicted in FIG. 2C, which is identical to the video arrangement that is to originally be displayed as depicted in FIG. 2A.

"Configuration Example of Video Signal Output Device and Television Receiver"

Figure 3:
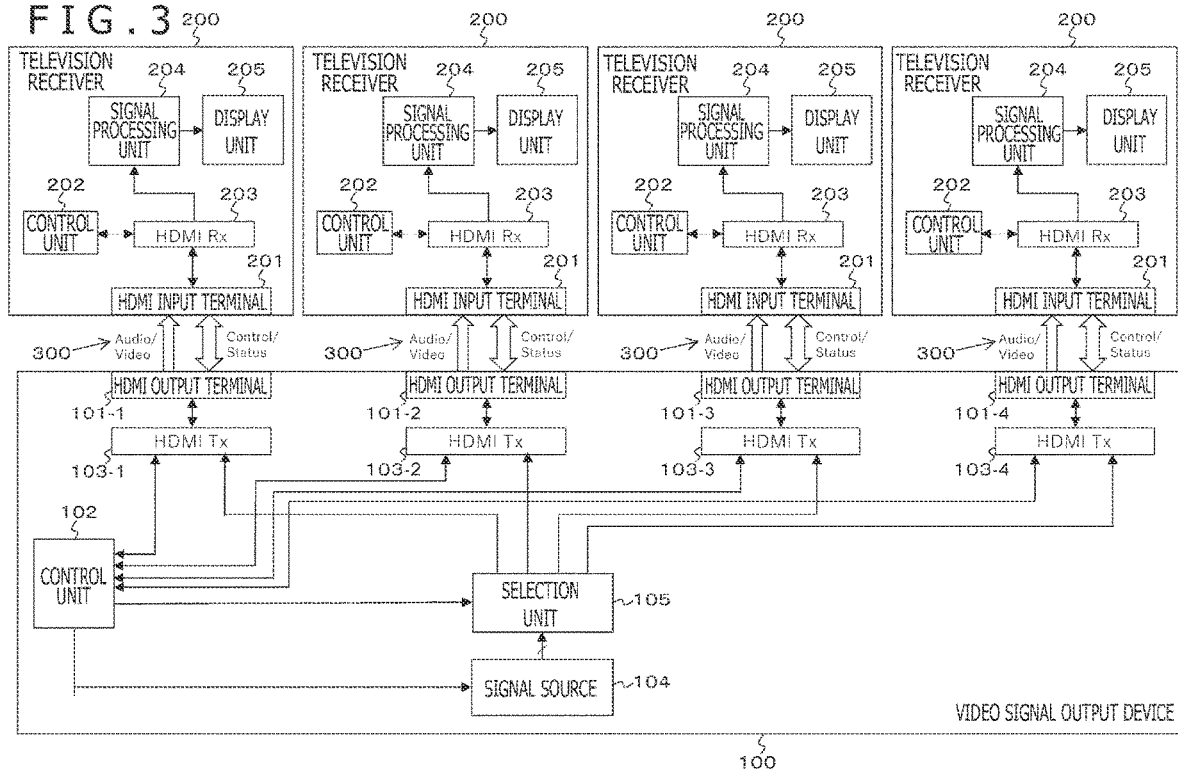
FIG. 3 is a block diagram for depicting a configuration example of the video signal output device and television receivers.

FIG. 3 depicts a configuration example of the video signal output device 100 and the television receivers 200. The video signal output device 100 has the HDMI output terminals 101-1 to 101-4, a control unit 102, HDMI transmission units (HDMI Tx) 103-1 to 103-4, a signal source 104, and a selection unit 105.

The HDMI transmission units 103-1 to 103-4 are connected to the HDMI output terminals 101-1 to 101-4, respectively, and transmit video signals and audio signals to the respective television receivers 200 connected to the HDMI output terminals 101-1 to 101-4 by communication compliant with HDMI.

The control unit 102 controls the operation of each unit of the video signal output device 100. In addition, the control unit 102 communicates control information with the television receivers 200 through an HDMI/CEC (Consumer Electronics Control) network including a CEC line that is a control data line of the HDMI cable 300.

Under the control of the control unit 102, the signal source 104 outputs video signals and audio signals to be transmitted to each of the multiple television receivers 200 included in the multi-display. In the illustrated example, video signals and audio signals to be transmitted to each of the four television receivers 200 (arranged in a two-by-two matrix as depicted in FIG. 1) are output. For example, each of the four video signals is assumed to be a video signal for displaying the same video, a video signal for displaying a divided video obtained by dividing one video into four, a video signal for displaying an independent video, or the like.

Here, it is also possible that multiple audios are simultaneously output by transmission of audio signals to all of the four television receivers 200. However, such disadvantages as a deviation in multiple same audio outputs due to a difference in audio paths and mixing of multiple different audio outputs, causing difficulty in hearing, are also assumed. Hence, instead of transmitting all the video signals to be transmitted to the four television receivers 200 with audio signals added thereto, it is also possible to transmit all the video signals without adding audio signals thereto, or to transmit only the specified video signal or the video signal selected by the user with audio added thereto.

It should be noted that it is also possible to transmit all the video signals to be transmitted to the four television receivers 200 with audio signals added thereto and to perform control as to whether or not audio is to be output, by each of the four television receivers 200. In the following description, an example of transmitting all the video signals without adding audio signals thereto will be described.

The selection unit 105 inputs video signals output from the signal source 104 and transmitted to each of the four television receivers 200, and selectively outputs the video signals to the HDMI transmission units 103-1 to 103-4 under the control of the control unit 102.

Here, when videos that are to originally be displayed on the four screens in the multi-screen corresponding to the multi-display including the four television receivers 200 being arranged in a two-by-two matrix are A, B, C, and D (see FIG. 2A, the selection unit 105 is controlled to output video signals for displaying the videos of A, B, C, and D to the HDMI transmission units 103-1, 103-2, 103-3, and 103-4 at the beginning after the power source is turned on.

In this case, depending on the respective arrangement positions of the four television receivers 200, it is also assumed that the videos displayed on the four screens of the multi-display including the four television receivers 200 are displayed in an arrangement different from the video arrangement to originally be displayed (see, for example, FIG. 2B. In this case, according to a video replacement operation signal sent from any of the television receivers 200 via the CEC line thereafter, the selection unit 105 is controlled by the control unit 102 to replace the video signals output to the HDMI transmission units 103-1, 103-2, 103-3, and 103-4. Accordingly, the videos displayed on the four screens of the multi-display including the four television receivers 200 are displayed in an arrangement identical to the video arrangement to originally be displayed (see, for example, FIG. 2C.

It should be noted that the CEC lines among the four HDMI outputs need to be disconnected in the video signal output device 100. This is to avoid breakdown because it is not assumed in the source apparatus that multiple sink apparatuses are connected in parallel. By disconnecting the CEC lines, four CEC systems mainly including the television receivers 200 exist in parallel in this system.

Each television receiver 200 has an HDMI input terminal 201, a control unit 202, an HDMI reception unit (HDMI Rx) 203, a signal processing unit 204, and a display unit 205. The HDMI reception unit 203 is connected to the HDMI input terminal 201, and receives video signals from the video signal output device 100 connected to the HDMI input terminal 201 by communication compliant with HDMI.

The control unit 202 controls the operation of each unit of the television receivers 200. In addition, the control unit 202 communicates control information with the video signal output device 100 through the HDMI/CEC network including the CEC line that is a control data line of the HDMI cable 300.

By operating an unillustrated user operation unit, the user can perform a setting operation of the screen configuration, a video replacement operation, and the like for the video signal output device 100. The user operation unit includes, for example, keys and buttons arranged on a housing of each television receiver 200, a touch panel arranged on the screen of each television receiver 200, or a remote controller.

The setting operation of the screen configuration, the video replacement operation, and the like for the video signal output device 100 can be performed by any of the four television receivers 200. In the case where this operation is performed by using a remote controller of any of the television receivers 200 and the remote controller is an infrared remote controller, it is necessary to stop the remote controller light receiving function of the other television receivers 200. In this case, it is possible to use a method of physically closing the light receiving portion or systematically turning off the light receiving function. Such consideration is not necessary in the case of using a Bluetooth remote controller. It should be noted that "Bluetooth" is a registered trademark.

The signal processing unit 204 performs such processing as scaling and contour enhancement for the video signal obtained by the HDMI reception unit 203, to obtain a video signal for display. The display unit 205 displays a video based on the video signal obtained by the signal processing unit 204. The display unit 205 includes, for example, an LCD (Liquid Crystal Display), an organic EL (Electro Luminescence), or the like.

It should be noted that, although the illustration is omitted, each television receiver 200 includes a television tuner. In addition, each television receiver 200 includes multiple HDMI input terminals 201 in some cases. In addition, in the illustrated example, the audio system is omitted.

"Configuration Example of HDMI Transmission Unit and HDMI Reception Unit"

Figure 4:
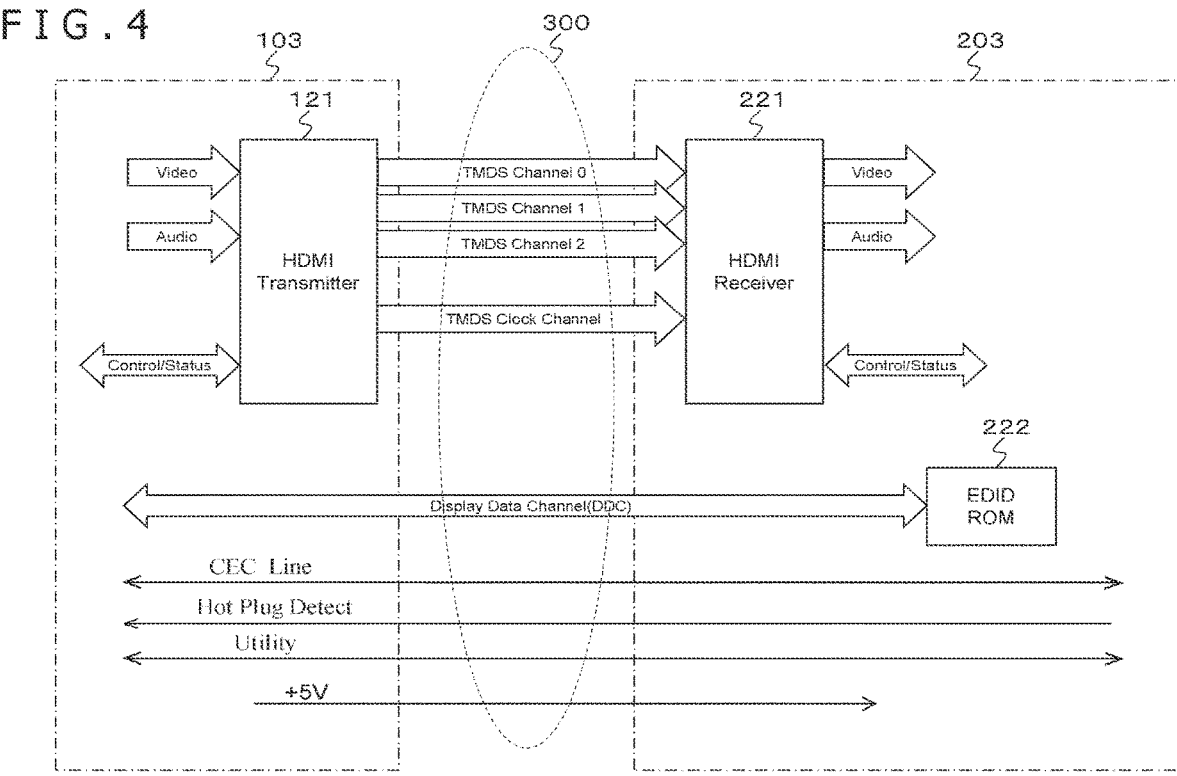
FIG. 4 is a diagram for depicting a general configuration example of an HDMI transmission unit in the video signal output device and an HDMI reception unit in the television receiver.

FIG. 4 depicts a general configuration example of the HDMI transmission unit 103 (103-1 to 103-4) of the video signal output device 100 and the HDMI reception unit 203 of the television receiver 200.

The HDMI transmission unit 103 transmits a differential signal corresponding to uncompressed video data (video signal) of a video of one screen to the HDMI reception unit 203 in one direction by multiple channels in an effective video section (hereinafter, also referred to as an "active video section" as appropriate) that is a section obtained by removing a horizontal blanking section and a vertical blanking section from a section from one vertical synchronization signal to the next vertical synchronization signal, and transmits a differential signal corresponding to at least audio data (audio signal), control data, other auxiliary data, and the like accompanying the video data to the HDMI reception unit 203 in one direction by multiple channels in the horizontal blanking section or the vertical blanking section.

That is, the HDMI transmission unit 103 has an HDMI transmitter 121. The HDMI transmitter 121 converts, for example, video data into a differential signal, and serially transmits the signal in one direction to the HDMI reception unit 203 to which the HDMI transmission unit 103 is connected via the HDMI cable 300 by three TMDS (Transition Minimized Differential Signaling) channels #0, #1, and #2 that are multiple channels.

In addition, the HDMI transmitter 121 converts an audio signal, necessary control data, other auxiliary data, and the like accompanying the video data into a differential signal, and serially transmits the signal in one direction to the HDMI reception unit 203 to which the HDMI transmission unit 103 is connected via the HDMI cable 300 by the three TMDS channels #0, #1, and #2.

Further, the HDMI transmitter 121 transmits a pixel clock synchronized with the video data transmitted by the three TMDS channels #0, #1, and #2 to the HDMI reception unit 203 to which the HDMI transmission unit 103 is connected via the HDMI cable 300, by a TMDS clock channel. Here, in one TMDS channel #i (i=0, 1, 2), 10-bit video data is transmitted during one clock of the pixel clock.

Here, TMDS coding is 8-bit/10-bit conversion coding for converting 8-bit data into 10-bit data, and is coding for maintaining a DC balance while suppressing such adverse effects as unnecessary radiation by reducing transition points in comparison with the previous data. Hence, since the run length of the coding cannot be guaranteed in theory, DC coupling and separate transmission of the clock are required.

The HDMI reception unit 203 receives the differential signal corresponding to the video data transmitted in one direction from the HDMI transmission unit 103 by multiple channels in the active video section, and receives the differential signal corresponding to audio data and control data transmitted in one direction from the HDMI transmission unit 103 by multiple channels in the horizontal blanking section or the vertical blanking section.

That is, the HDMI reception unit 203 has an HDMI receiver 221. The HDMI receiver 221 receives the differential signal corresponding to the video data and the differential signal corresponding to audio data and control data transmitted in one direction from the HDMI transmission unit 103 to which the HDMI reception unit 203 is connected via the HDMI cable 300, by the TMDS channels #0, #1, and #2, in synchronization with the pixel clock similarly transmitted from the HDMI transmission unit 103 by the TMDS clock channel.

The transmission channel of the HDMI system including the HDMI transmission unit 103 and the HDMI reception unit 203 includes a transmission channel called a DDC (Display Data Channel). The DDC includes two unillustrated signal lines included in the HDMI cable 300, and is used by the HDMI transmission unit 103 to read E-EDID (Enhanced Extended Display Identification Data) from the HDMI reception unit 203.

In addition to the above-described TMDS channels #0 to #2, TMDS clock channel, and DDC, the transmission channel of the HDMI system includes a transmission channel called a CEC line (Consumer Electronics Control Line). The CEC line includes one signal line included in the HDMI cable 300, and is used for bi-directional communication of control data between the HDMI transmission unit 103 and the HDMI reception unit 203. The CEC line configures a control data line.

In addition, the HDMI cable 300 includes an HPD line (Hot Plug Detect Line). The source apparatus can detect the connection of the sink apparatus by using the HPD line. It should be noted that in FIG. 4, the HPD line is indicated with an arrow to indicate one direction from the sink apparatus to the source apparatus. However, the HPD line is also used as an HEAC (HDMI Ethernet and Audio Return Channel)-line that configures a bi-directional communication path, and becomes a bi-directional line in such a case.

In addition, the HDMI cable 300 includes a power line (+5V Power Line) used to supply power from the source apparatus to the sink apparatus. Further, the HDMI cable 300 includes a utility line. The utility line is also used as an HEAC (HDMI Ethernet and Audio Return Channel)+line that configures a bi-directional communication path.

"Screen Configuration Setting and Video Replacement"

Figure 5:
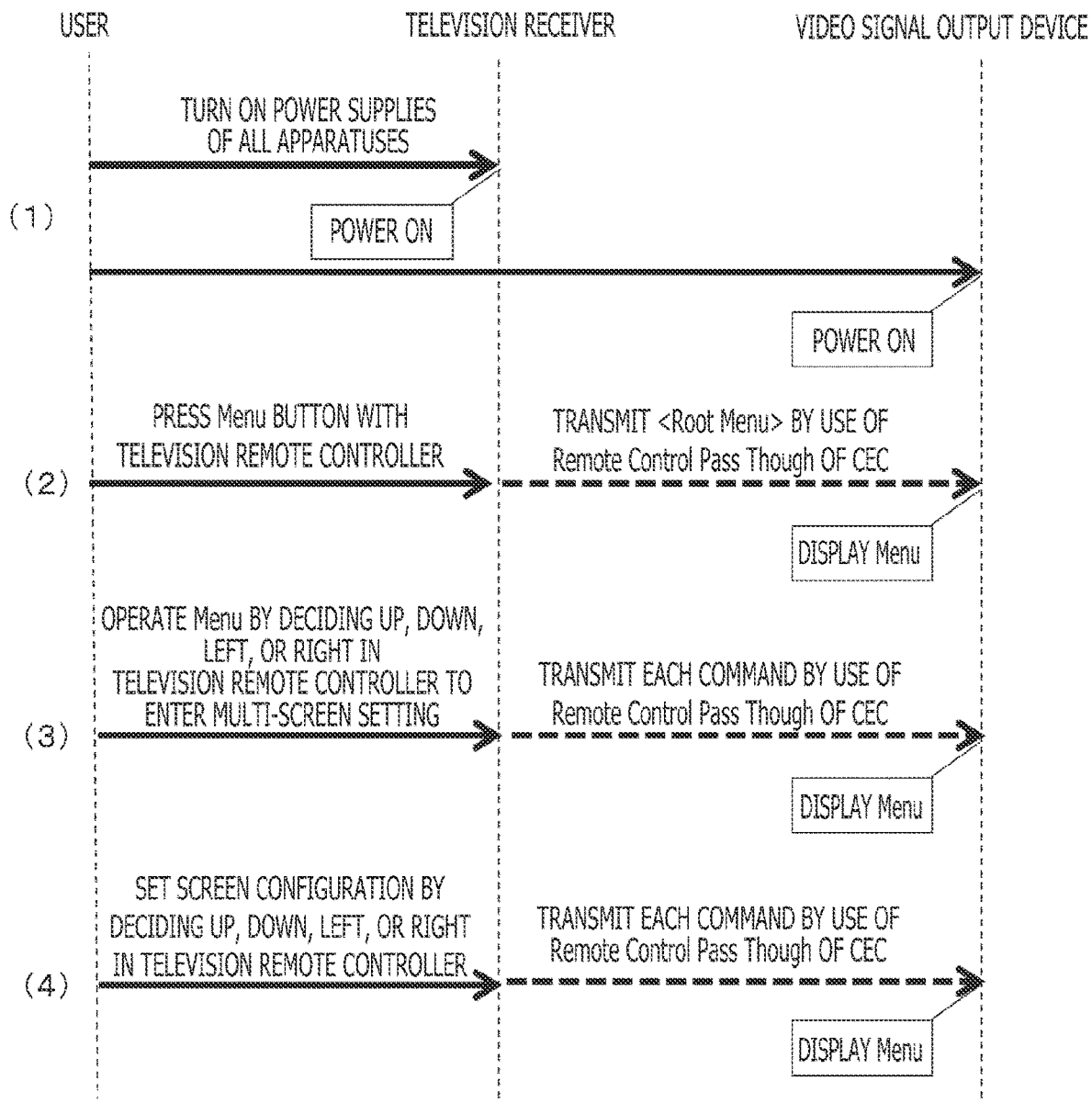
FIG. 5 is a sequence diagram (1/3) corresponding to an example of processing of screen configuration setting and video replacement in the multi-display system.
Figure 6:
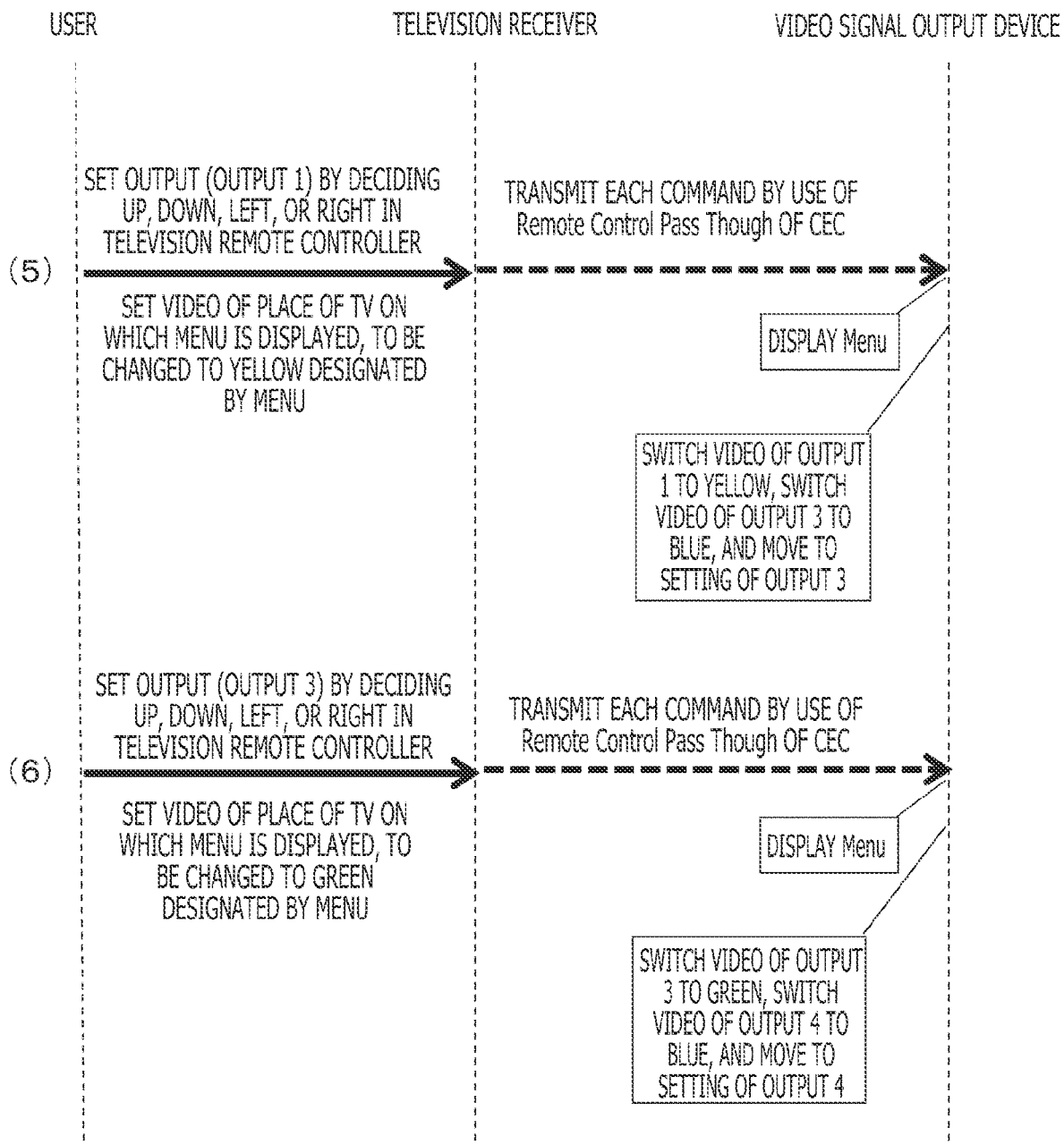
FIG. 6 is a sequence diagram (2/3) corresponding to an example of processing of the screen configuration setting and the video replacement in the multi-display system.
Figure 7:
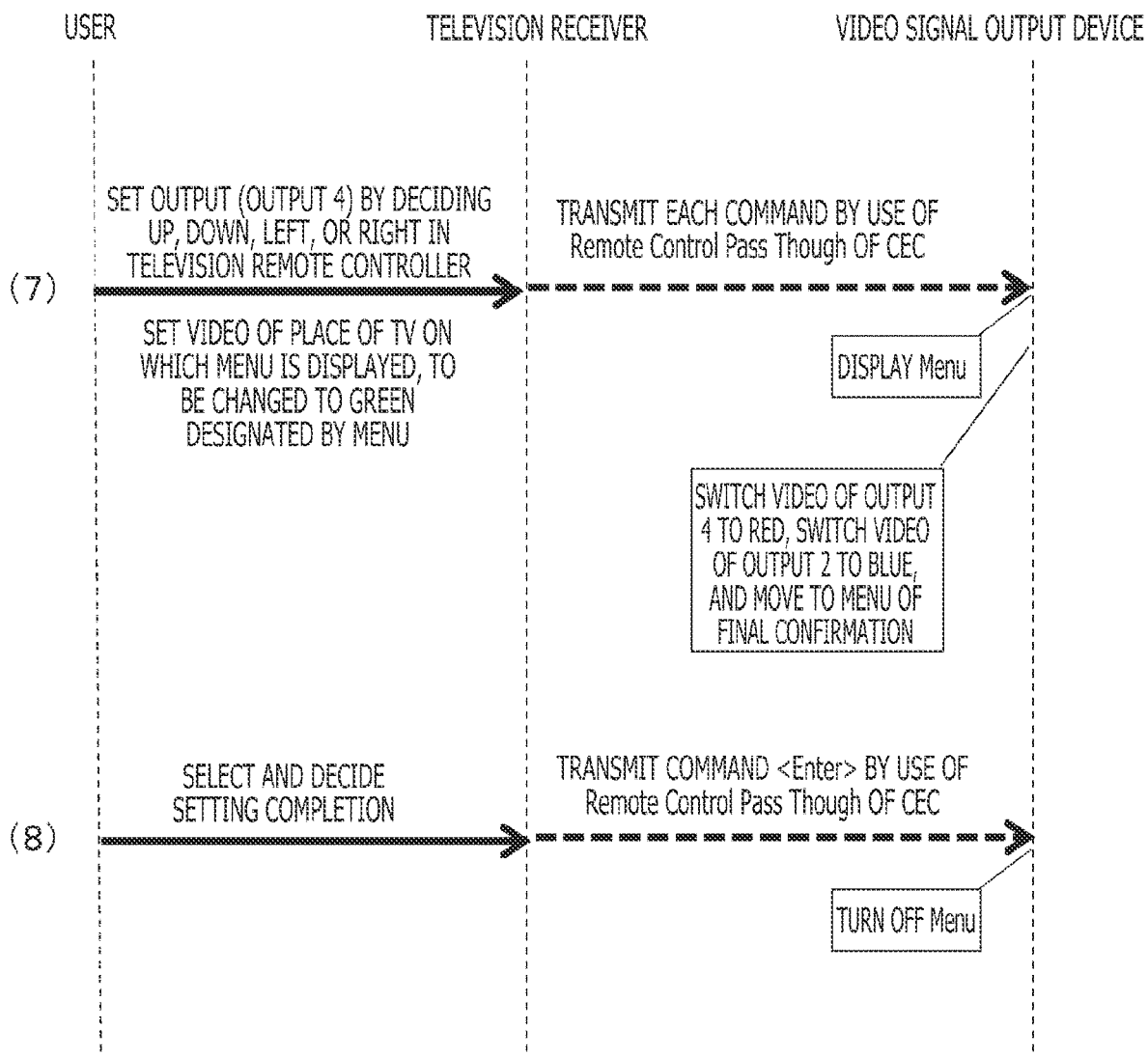
FIG. 7 is a sequence diagram (3/3) corresponding to an example of processing of the screen configuration setting and the video replacement in the multi-display system.

Next, an example of processing of screen configuration setting and video replacement in the multi-display system 10 depicted in FIG. 1 and FIG. 3 will be described with reference to the sequence diagrams of FIG. 5 to FIG. 7.

Figure 8A:
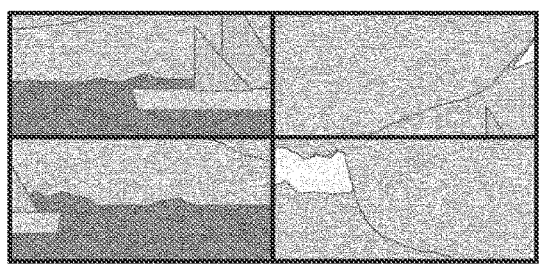
FIGS. 8A, 8B, and 8C depict diagrams each explaining an example of processing of the screen configuration setting and the video replacement in the multi-display system.

(1) First, all the apparatuses, that is, the video signal output device 100 and the four television receivers 200, are turned on by a user operation. FIG. 8A depicts an example of videos displayed on the screens of the multi-display including the four television receivers 200 in this state. In the illustrated example, divided videos obtained by dividing one video into four are displayed on screens, but the video arrangement is not correct.

(2) Next, by using a remote controller of one television receiver 200, the video signal output device 100 is operated with use of a remote control pass through (Remote Control Pass Though) function of the CEC. When the user presses the Menu button of the remote controller, a command defined for starting such Menu as <Root Menu> and <Setup Menu> is transmitted from the television receiver 200 to the video signal output device 100 via the CEC.

Figure 8B:
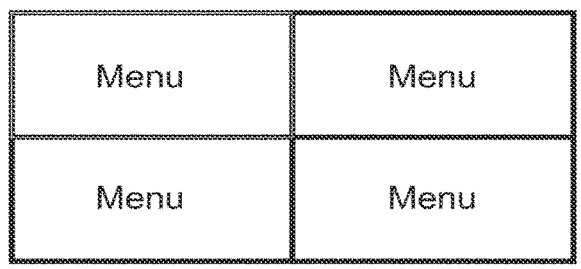

Accordingly, the video signals output from the signal source 104 of the video signal output device 100 and transmitted to the four television receivers 200 become video signals for displaying the menu. Hence, the videos displayed on the screens of the multi-display including the four television receivers 200 become a menu display as depicted in FIG. 8B.

(3) Then, the user refers to the menu display and performs a menu operation by using up, down, left, and right decision buttons of the remote controller to enter the multi-screen setting, that is, the screen configuration setting. In this case, a command corresponding to the operation is transmitted from the television receiver 200 to the video signal output device 100 by the remote control pass through function of the CEC.

Figure 8C:
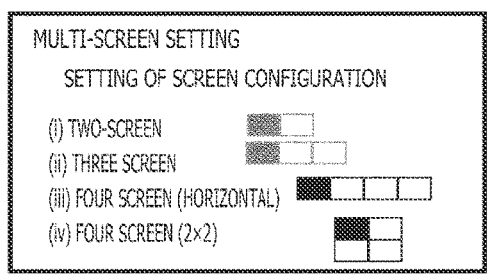

At the time of entering the screen configuration setting, video signals for a menu display output from the signal source 104 of the video signal output device 100 and transmitted to the four television receivers 200 become those for menu display for the user to perform a setting (selection) operation of the screen configuration. That is, the video signals transmitted from the video signal output device 100 to the television receivers 200 include a user interface display for the user to perform the setting operation of the screen configuration of the multi-display. FIG. 8C depicts an example of a menu display for performing the screen configuration setting displayed on each screen of the multi-display including the four television receivers 200 in this case.

The menu display for performing the screen configuration setting displays all the screen configurations that the video signal output device 100 can cope with. In the illustrated example, four screen configurations of a two-screen configuration in a horizontal row, a three-screen configuration in a horizontal row, a four-screen configuration in a horizontal row, and a four-screen configuration in a two-by-two matrix are displayed as screen configurations that the video signal output device 100 can cope with.

Although the detailed description is omitted, the video signal output device 100 can detect whether or not the television receivers 200 are connected to the respective HDMI output terminals 101-1 to 101-4, according to the voltage of the HPD line. The video signal output device 100 can recognize how many television receivers 200 are connected, and in the menu display for performing the screen configuration setting, the options of the screen configuration that the user can select can be limited to those that match the number of connected television receivers 200. Accordingly, the user can easily perform the selection operation of the screen configuration.

In the case of the example depicted in FIG. 8C, since the four television receivers 200 are connected, two screen configurations, i.e., the four-screen configuration in a horizontal line and the four-screen configuration in two-by-two matrix, are displayed as the screen configurations that the user can select. The two-screen configuration in a horizontal row and the three-screen configuration in a horizontal row are gray-out displayed and cannot be selected by the user.

(4) Subsequently, with reference to the menu display for the user to perform the screen configuration setting, the setting (selection) operation of the screen configuration is performed by use of the up, down, left, and right decision buttons of the remote controller, so that the screen configuration is selected to enter video replacement. In this case, a command corresponding to the operation is transmitted from the television receiver 200 to the video signal output device 100 by the remote control pass through function of the CEC. It should be noted that, here, the user performs an operation of selecting the four-screen configuration in a two-by-two matrix.

When the screen configuration is selected by the user and a screen configuration setting operation signal (a CEC command corresponding to the operation) is sent from the television receiver 200 to the video signal output device 100, the video signals output from the signal source 104 of the video signal output device 100 and transmitted to the four television receivers 200 under the control of the control unit 102 correspond to the screens in the multi-screen having the four-screen configuration in a two-by-two matrix. In this case, each video signal includes display information indicating which screen in the multi-screen the video signal corresponds to. The display information is, for example, information for displaying at least any of colors, patterns, numbers, letters, symbols, and the like. In the following description, the display information is assumed to be information for displaying a color.

Figure 9A:
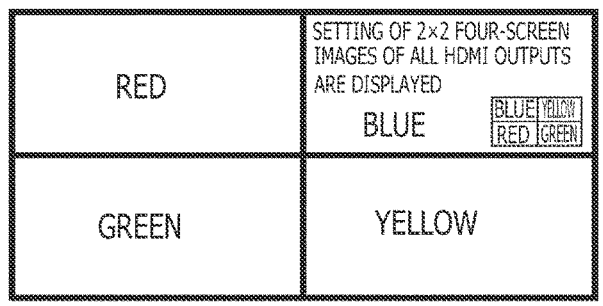
FIGS. 9A, 9B, and 9C depict diagrams each explaining an example of processing of the screen configuration setting and the video replacement in the multi-display system.

In addition, in this case, the video signal corresponding to a predetermined screen, for example, the upper left screen, in the multi-screen is one for menu display for the user to perform an operation of the video replacement. That is, the video signal transmitted from the video signal output device 100 to any of the television receivers 200 includes user interface display information for the user to perform the video replacement operation. FIG. 9A depicts an example of a video displayed on each screen of the multi-display including the four television receivers 200 arranged in a two-by-two matrix in that case.

It should be noted that, in the illustrated example, the word "blue," "red," "yellow," or "green" indicates the color of the video displayed on the screen. That is, a red video is displayed on the upper left screen, a green video is displayed on the lower left screen, a blue video is displayed on the upper right screen, and a yellow video is displayed on the lower right screen. In addition, in the illustrated example, the blue video is to originally be displayed on the upper left screen in the multi-screen, and a menu display for the user to perform the video replacement operation is superimposed on the blue video. In addition, a display indicating a correct video arrangement (the upper left screen for the blue video, the lower left screen for the red video, the upper right screen for the yellow video, and the lower right screen for the green video) in each screen in the multi-screen is also superimposed on the blue video.

Figure 9B:
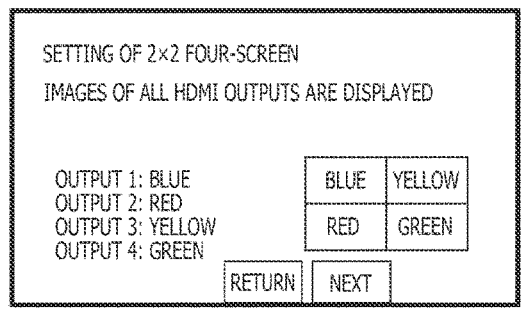

FIG. 9B depicts details of the display superimposed on the blue video. This display includes, in addition to the menu display for the user to perform the video replacement operation and the display indicating a correct video arrangement in each screen in the multi-screen as described above, a display indicating which screen of the multiple screens the video signal currently output to each of the HDMI terminals 101-1 to 101-4 of the video signal output device 100 corresponds to.

Here, it is depicted that the video signal (the video signal of the blue video) corresponding to the upper left screen in the multi-screen is output to the HDMI output terminal 101-1 (output 1), the video signal (the video signal of the red video) corresponding to the lower left screen in the multi-screen is output to the HDMI output terminal 101-2 (output 2), the video signal (the video signal of the yellow video) corresponding to the upper right screen in the multi-screen is output to the HDMI output terminal 101-3 (output 3), and the video signal (the video signal of the green video) corresponding to the lower right screen in the multi-screen is output to the HDMI output terminal 101-4 (output 4).

Figure 9C:
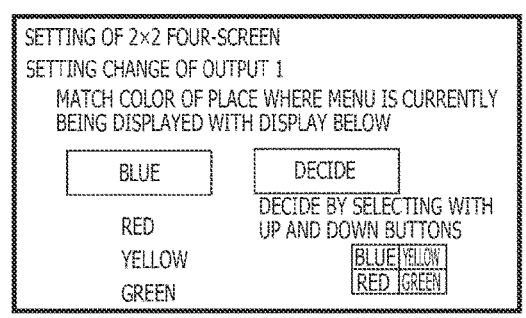

When the user performs an operation for change to the next screen by using the remote controller with reference to the menu display of FIG. 9B, the superimposed display in the blue video changes to a display for changing the setting of the output 1, that is, for the user to perform the replacement operation of the video signal (video) output to the HDMI output terminal 101-1 (output 1), as depicted in FIG. 9C.

(5) Next, with reference to the menu display depicted in FIG. 9C, the user operates the remote controller to change the video signal to be output to the HDMI output terminal 101-1 (output 1) from the video signal of the blue video to the video signal of the yellow video. This operation is an operation for replacing the video displayed on the upper right screen in the multi-display including the four television receivers 200 from the blue video (the video corresponding to the upper left screen in the multi-screen) to the yellow video (the video corresponding to the upper right screen in the multi-screen).

Here, since the video of the video signal (the video signal of the blue video) corresponding to the upper left screen in the multi-screen that is currently being output to the HDMI output terminal 101-1 (output 1) is displayed on the upper right screen of the multi-display including the four television receivers 200 (see FIG. 9A, the user can understand that the video signal to be output to the HDMI output terminal 101-1 (output 1) is the video signal (the video signal of the yellow video) corresponding to the upper right screen in the multi-screen.

Performance of the replacement operation of the video signal (video) by the user in such a manner leads to the video signal being replaced by the selection unit 105 under the control of the control unit 102 in the video signal output device 100. In this case, a command corresponding to the operation is transmitted from the television receiver 200 to the video signal output device 100 by the remote control pass through function of the CEC.

In this case, the video signals are replaced such that the video signal (the video signal of the yellow video) corresponding to the upper right screen in the multi-screen is output to the HDMI output terminal 101-1 (output 1) and the video signal (the video signal in the blue video) corresponding to the upper left screen of the multi-screen is output to the HDMI output terminal 101-3 (output 3) to which the video signal (the video signal of the yellow video) corresponding to the upper right screen in the multi-screen has been output.

Figure 10A:
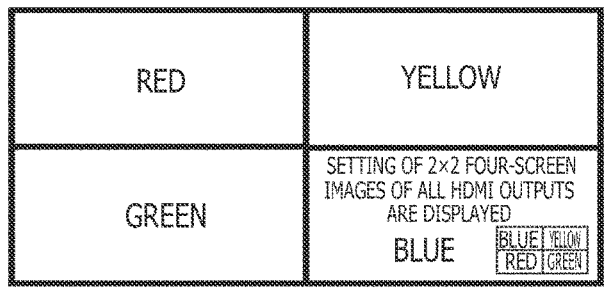
FIGS. 10A, 10B, and 10C depict diagrams each explaining an example of processing of the screen configuration setting and the video replacement in the multi-display system.

FIG. 10A depicts an example of a video displayed on each screen of the multi-display including the four television receivers 200 in this case. In this case, a red video is displayed on the upper left screen, a green video is displayed on the lower left screen, a yellow video is displayed on the upper right screen, and a blue video is displayed on the lower right screen.

Figure 10B:
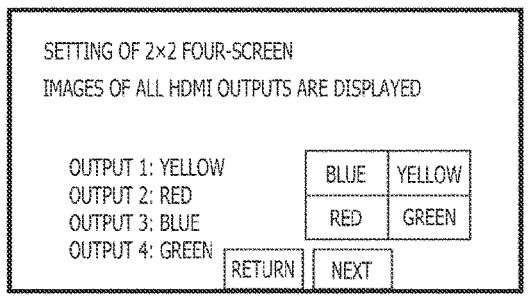

FIG. 10B depicts details of the display superimposed on the blue video. As in FIG. 9B, this display includes, in addition to the menu display for the user to perform the video replacement operation and the display indicating a correct video arrangement in each screen in the multi-screen, a display indicating which screen in the multi-screen the video signal currently output to each of the HDMI terminals 101-1 to 101-4 of the video signal output device 100 corresponds to.

Here, it is depicted that the video signal (the video signal of the yellow video) corresponding to the upper right screen in the multi-screen is output to the HDMI output terminal 101-1 (output 1), the video signal (the video signal of the red video) corresponding to the lower left screen in the multi-screen is output to the HDMI output terminal 101-2 (output 2), the video signal (the video signal of the blue video) corresponding to the upper left screen in the multi-screen is output to the HDMI output terminal 101-3 (output 3), and the video signal (the video signal of the green video) corresponding to the lower right screen in the multi-screen is output to the HDMI output terminal 101-4 (output 4).

Figure 10C:
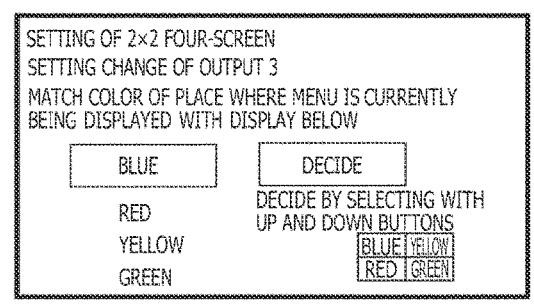

When the user performs an operation for change to the next screen by using the remote controller with reference to the menu display of FIG. 10B, the superimposed display in the blue video changes to a display for changing the setting of the output 3, that is, for the user to perform the replacement operation of the video signal (video) output to the HDMI output terminal 101-3 (output 3), as depicted in FIG. 10C.

(6) Subsequently, with reference to the menu display depicted in FIG. 10C, the user operates the remote controller to change the video signal to be output to the HDMI output terminal 101-3 (output 3) from the video signal of the blue video to the video signal of the green video. This operation is an operation for replacing the video displayed on the lower right screen in the multi-display including the four television receivers 200 from the blue video (the video corresponding to the upper left screen in the multi-screen) to the green video (the video corresponding to the lower right screen in the multi-screen).

Here, since the video of the video signal (the video signal of the blue video) corresponding to the upper left screen in the multi-screen that is currently being output to the HDMI output terminal 101-3 (output 3) is displayed on the lower right screen of the multi-display including the four television receivers 200 (see FIG. 10A, the user can understand that the video signal to be output to the HDMI output terminal 101-3 (output 3) is the video signal (the video signal of the green video) corresponding to the lower right screen in the multi-screen.

Performing the replacement operation of the video signal (video) by the user in such a manner leads to the video signal being replaced by the selection unit 105 under the control of the control unit 102 in the video signal output device 100. In this case, a command corresponding to the operation is transmitted from the television receiver 200 to the video signal output device 100 by the remote control pass through function of the CEC.

In this case, the video signals are replaced such that the video signal (the video signal of the green video) corresponding to the lower right screen in the multi-screen is output to the HDMI output terminal 101-3 (output 3) and the video signal (the video signal of the blue video) corresponding to the upper left screen in the multi-screen is output to the HDMI output terminal 101-4 (output 4) to which the video signal (the video signal of the green video) corresponding to the lower right screen in the multi-screen has been output.

Figure 11A:
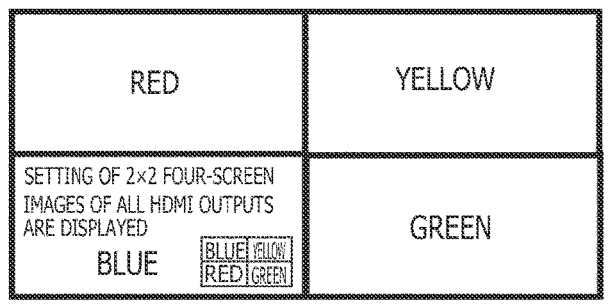
FIGS. 11A, 11B, and 11C depict diagrams each explaining an example of processing of the screen configuration setting and the video replacement in the multi-display system.

FIG. 11A depicts an example of a video displayed on each screen of the multi-display including the four television receivers 200 in this case. In this case, a red video is displayed on the upper left screen, a blue video is displayed on the lower left screen, a yellow video is displayed on the upper right screen, and a green video is displayed on the lower right screen.

Figure 11B:
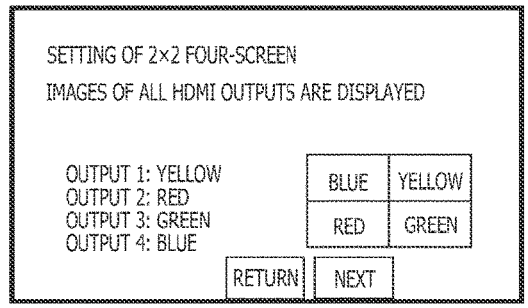

FIG. 11B depicts details of the display superimposed on the blue video. As in FIGS. 9B and 10B, this display includes, in addition to the menu display for the user to perform the video replacement operation and the display indicating a correct video arrangement in each screen in the multi-screen, a display indicating which screen in the multi-screen the video signal currently output to each of the HDMI terminals 101-1 to 101-4 of the video signal output device 100 corresponds to.

Here, it is depicted that the video signal (the video signal of the yellow video) corresponding to the upper right screen in the multi-screen is output to the HDMI output terminal 101-1 (output 1), the video signal (the video signal of the red video) corresponding to the lower left screen in the multi-screen is output to the HDMI output terminal 101-2 (output 2), the video signal (the video signal of the green video) corresponding to the lower right screen in the multi-screen is output to the HDMI output terminal 101-3 (output 3), and the video signal (the video signal of the blue video) corresponding to the upper left screen in the multi-screen is output to the HDMI output terminal 101-4 (output 4).

Figure 11C:
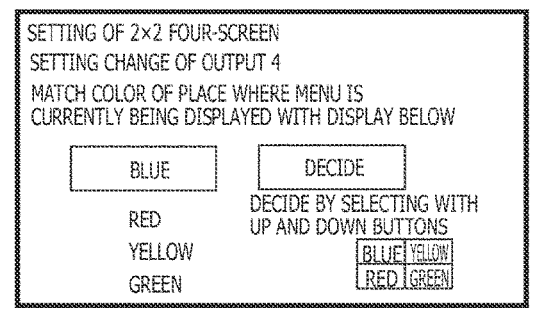

When the user performs an operation for change to the next screen by using the remote controller with reference to the menu display of FIG. 11B, the superimposed display in the blue video changes to a display for changing the setting of the output 4, that is, for the user to perform the replacement operation of the video signal (video) output to the HDMI output terminal 101-4 (output 4), as depicted in FIG. 11C.

(7) Then, with reference to the menu display depicted in FIG. 11C, the user operates the remote controller to change the video signal to be output to the HDMI output terminal 101-4 (output 4) from the video signal of the blue video to the video signal of the red video. This operation is an operation for replacing the video displayed on the lower left screen in the multi-display including the four television receivers 200 from the blue video (the video corresponding to the upper left screen in the multi-screen) to the red video (the video corresponding to the lower left screen in the multi-screen).

Here, since the video of the video signal (the video signal of the blue video) corresponding to the upper left screen in the multi-screen that is currently being output to the HDMI output terminal 101-4 (output 4) is displayed on the lower left screen of the multi-display including the four television receivers 200 (see FIG. 11A, the user can understand that the video signal to be output to the HDMI output terminal 101-4 (output 4) is the video signal (the video signal of the red video) corresponding to the lower left screen in the multi-screen.

Performing the replacement operation of the video signal (video) by the user in such a manner leads to the video signal being replaced by the selection unit 105 under the control of the control unit 102 in the video signal output device 100. In this case, a command corresponding to the operation is transmitted from the television receiver 200 to the video signal output device 100 by the remote control pass through function of the CEC.

In this case, the video signals are replaced such that the video signal (the video signal of the red video) corresponding to the lower left screen in the multi-screen is output to the HDMI output terminal 101-4 (output 4) and the video signal (the video signal of the blue video) corresponding to the upper left screen in the multi-screen is output to the HDMI output terminal 101-2 (output 2) to which the video signal (the video signal of the red video) corresponding to the lower left screen in the multi-screen has been output.

Figure 12A:
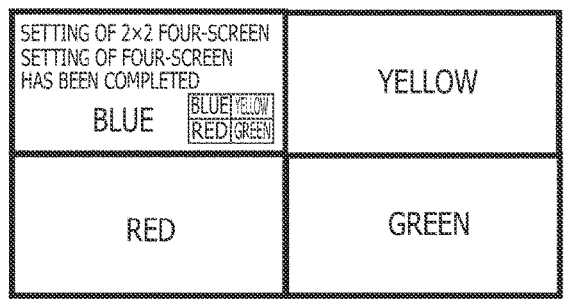
FIGS. 12A, 12B, and 12C depict diagrams each explaining an example of processing of the screen configuration setting and the video replacement in the multi-display system.

FIG. 12A depicts an example of a video displayed on each screen of the multi-display including the four television receivers 200 in this case. In this case, a blue video is displayed on the upper left screen, a red video is displayed on the lower left screen, a yellow video is displayed on the upper right screen, and a green video is displayed on the lower right screen, which are correct video arrangements.

Figure 12B:
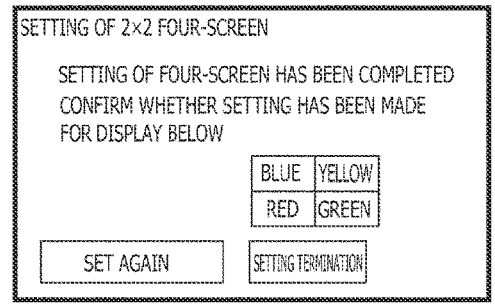

In this case, a menu display for the user to perform a setting confirmation operation is superimposed on the blue video. In addition, a display indicating a correct video arrangement (the upper left screen for the blue video, the lower left screen for the red video, the upper right screen for the yellow video, and the lower right screen for the green video) in each screen in the multi-screen is also superimposed on the blue video. FIG. 12B depicts details of the display superimposed on the blue video.

(8) When the user performs a setting end operation by using the remote controller with reference to the menu display depicted in FIG. 12B, the video replacement operation is completed. In this case, a command <Enter> is transmitted from the television receiver 200 to the video signal output device 100 by the remote control pass through function of the CEC.

Figure 12C:
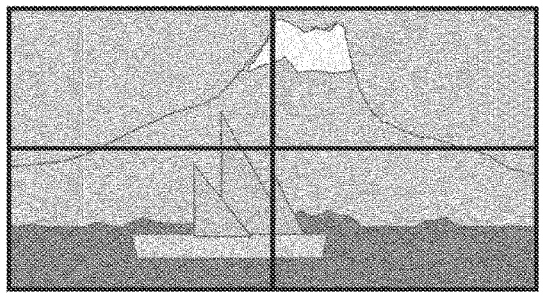

In this case, the video signals output from the signal source 104 of the video signal output device 100 and transmitted to the four television receivers 200 do not include the display information for indicating which screen in the multi-screen each video signal corresponds to or the display information for menu display for the user to perform the setting operation. FIG. 12C depicts an example of a video displayed on each screen of the multi-display including the four television receivers 200 in this state. In the illustrated example, divided videos obtained by dividing one video into four are displayed on the screens, and the video arrangement is correct.

As described above, in the multi-display system 10 depicted in FIG. 1, the replacement of the video signals is controlled on the video signal output device 100 side such that a correct video corresponding to the screen is displayed on each screen of the multi-display including the multiple television receivers 200. Hence, the multiple television receivers 200 can be arranged at any position, the terminals of the video signal output device 100 to which the multiple television receivers 200 are connected can also be arranged at any position, and the multi-display system can easily be configured with use of general television receivers (display devices).

In addition, in the multi-display system 10 depicted in FIG. 1, the video signal output device 100 controls the video signal replacement according to the video replacement operation signal sent from any of the television receivers 200. In this case, the video replacement operation signal is generated by the video replacement operation performed by the user who can observe the video displayed on each of the multiple screens of the multi-display including the multiple television receivers 200, and the video signal output device 100 can appropriately perform the video signal replacement control such that a correct video corresponding to the screen is displayed on the multiple screens of the multi-display.

2. Modified Example

It should be noted that, in the above-described embodiment, it has been explained that the video signals output from the signal source 104 of the video signal output device 200 and transmitted to the four television receivers 200 include the display information for indicating which screen in the multi-screen each video signal corresponds to, and the display information is information for displaying, for example, at least any of colors, patterns, numbers, letters, symbols, and the like.

Figure 13A:
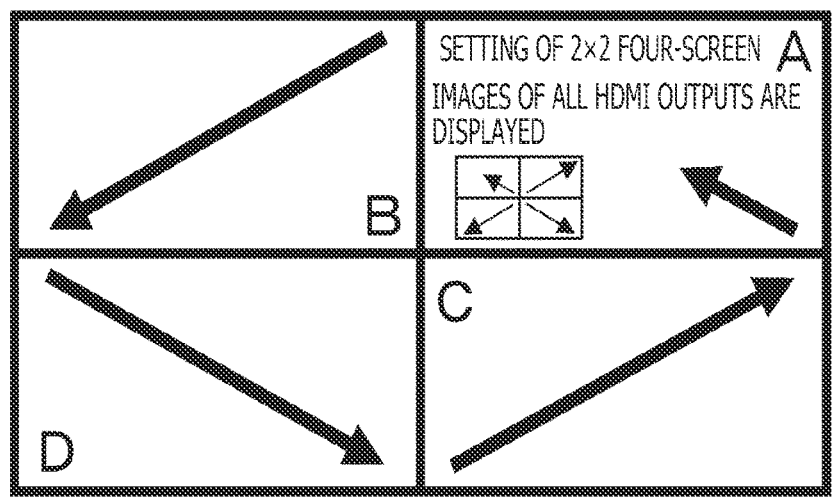
FIGS. 13A and 13B depict diagrams each explaining an example of a display indicating on which screens videos displayed on the screens of the multi-display are to originally be displayed.
Figure 13B:
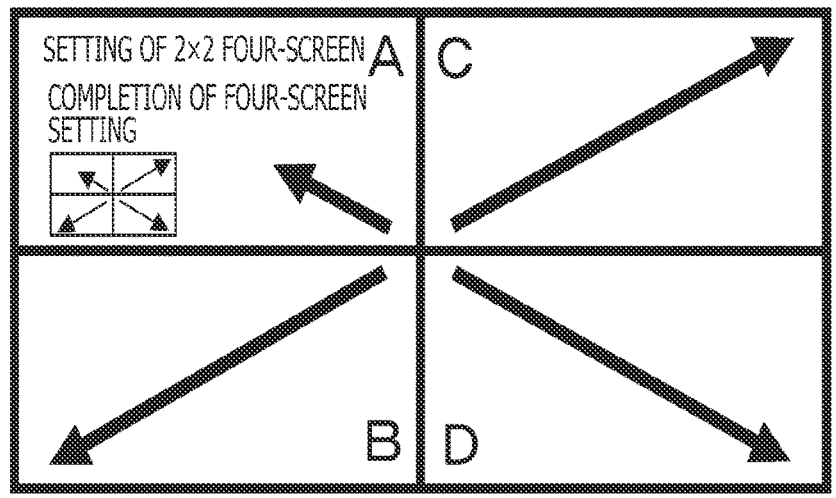

In this case, it is possible to use information, as the display information, that displays a picture, for example, a pictogram pursuing easier understanding. FIGS. 13A and 13B depict examples in which radial arrows are displayed on respective videos. It should be noted that, in the illustrated examples, the letters "A," "B," "C," and "D" are also displayed on the respective videos. In this case, "A" indicates the upper left screen, "B" indicates the lower left screen, "C" indicates the upper right screen, and "D" indicates the lower right screen.

FIG. 13A depicts a state in which videos are not correctly displayed on the screens. In addition, FIG. 13B depicts a state in which videos are correctly displayed on the screens, and in this case, a picture (pictogram) in which the arrows of the respective screens are arranged from the center to the outside is displayed.

Figure 14A:
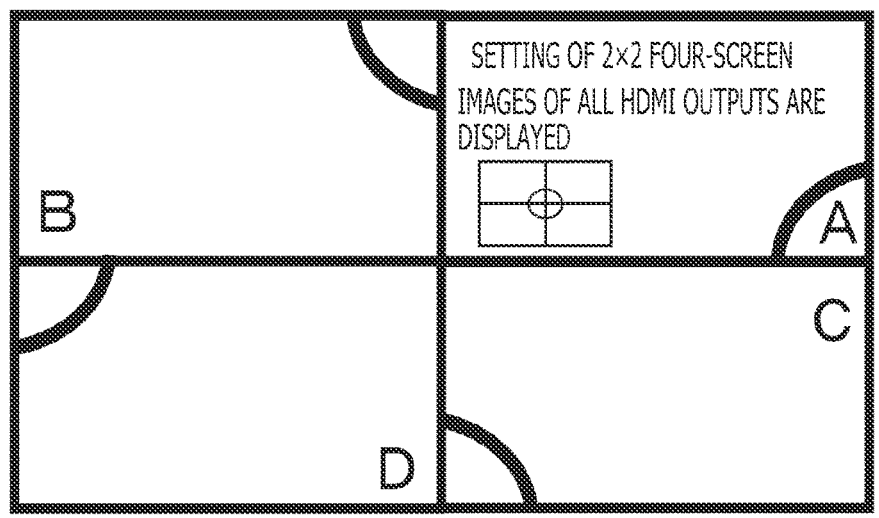
FIGS. 14A and 14B depict diagrams each explaining another example of a display indicating on which screens videos displayed on the screens of the multi-display are to originally be displayed.
Figure 14B:
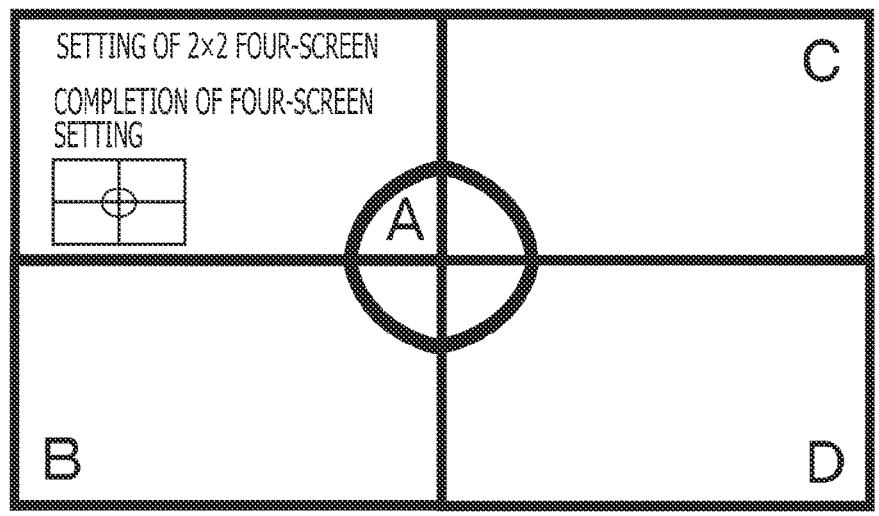

FIGS. 14A and 14B depict examples for displaying arc portions each obtained by dividing a circle into four on respective videos. It should be noted that, even in the illustrated examples, the letters "A," "B," "C," and "D" are also displayed on the respective videos as in the examples of FIGS. 13A and 13B. FIG. 14A depicts a state in which videos are not correctly displayed on the screens. In addition, FIG. 14B depicts a state in which videos are correctly displayed on the screens, and in this case, a circle picture (pictogram) in which each arc portion is combined is displayed.

It should be noted that these pictures can be varied depending on the shape of the multi-display.

In addition, in the above-described embodiment, although the operation in the menu layer of the video signal output device 100 has been described at an early stage in the example of the processing of the screen configuration setting and the video replacement, it is also possible to operate the menu by using a direct command instead of using the existing HDMI CEC command via several layers.

In this case, a function to directly call the multi-screen setting is provided on the television receiver 200 side, and when the operation is performed, a command to call the multi-screen setting is transmitted via the HDMI CEC. This command becomes a new command of the CEC, and it is necessary to create a new command in such a method that the command is newly defined in the HDMI standard or a command that can be used as a vender command in a closed range in an apparatus of the same manufacturer is defined within the manufacturer.

Figure 15:
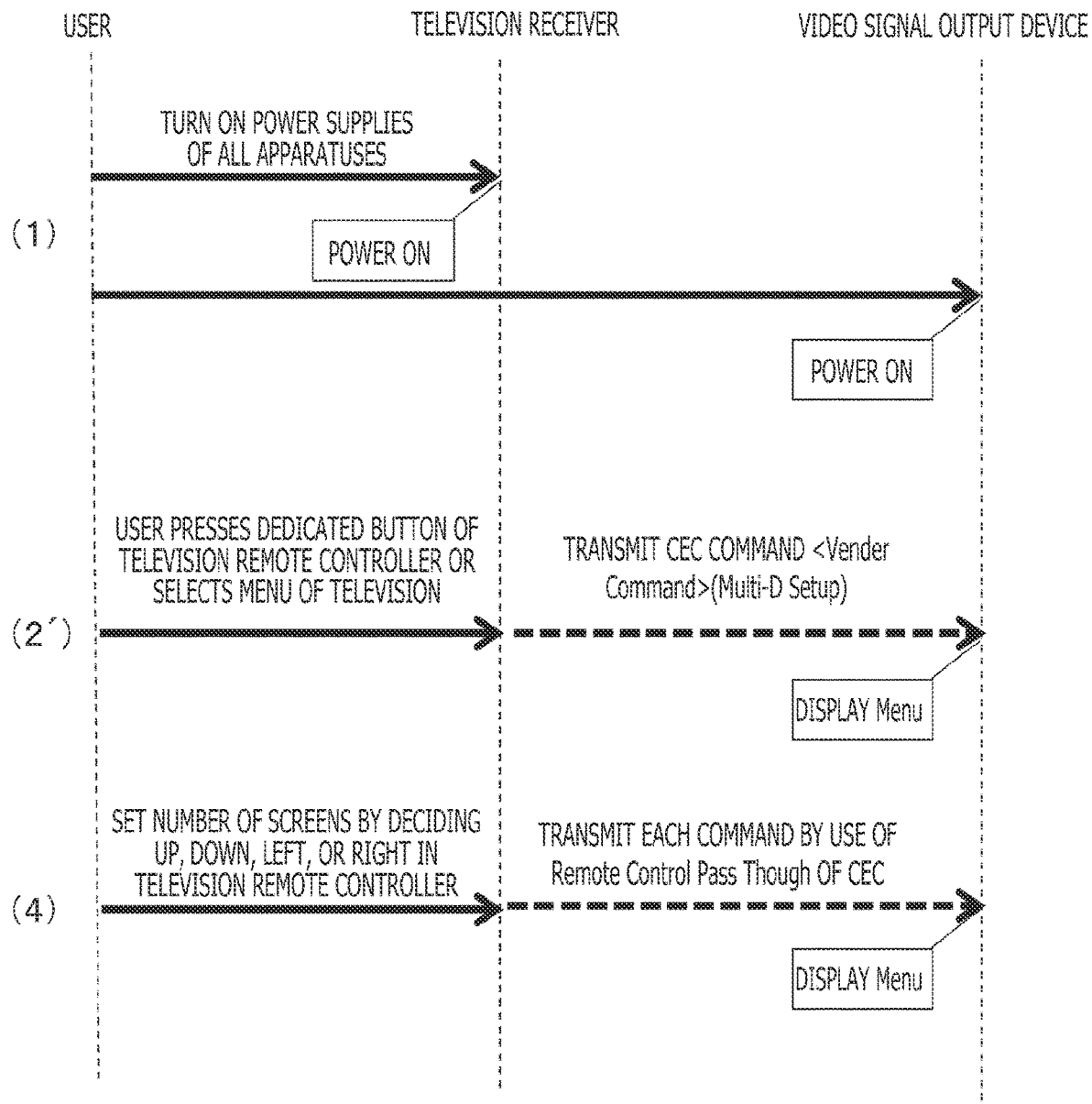
FIG. 15 is another sequence diagram corresponding to processing of the screen configuration setting and the video replacement in the multi-display system.

FIG. 15 depicts a sequence diagram (a portion corresponding to FIG. 5) in the case of transmitting the vender command. In the case of the sequence diagram of FIG. 15, the following process (2') is performed in place of the processes (2) and (3) of FIG. 5.

(2') Next, by pressing a dedicated button of the remote controller of one television receiver 200 or by selecting the menu on the television receiver 200, a CEC command <Vender Command> {Multi-D Setup} is sent from the television receiver 200 to the video signal output device 100. Accordingly, the video signal output device 100 immediately enters the multi-screen setting, that is, the screen configuration setting.

In addition, in the above-described embodiment, the CEC line is used as a line for transmitting the video replacement operation signal and the like from the television receiver 200 to the video signal output device 100, but it is possible to use a DDC line or other communication lines.

In addition, in the above-described embodiment, the example of using the HDMI as the digital interface between the video signal output device 100 and the television receivers 200 has been depicted. The present technique is similarly applicable to systems using other digital interfaces such as DisplayPort.

In addition, although the preferred embodiment of the present disclosure has been described in detail with reference to the accompanying drawings, the technical scope of the present disclosure is not limited to such examples. It is obvious that a person having ordinary knowledge in the technical field of the present disclosure can arrive at various modified examples or corrected examples within the scope of the technical ideas described in the claims, and it is naturally understood that these also belong to the technical scope of the present disclosure.

In addition, the effects described in the specification are explanatory or illustrative only, and are not restrictive. That is, the technique according to the present disclosure can exhibit other effects, together with or in place of the above effects, apparent to those skilled in the art from the description of the specification.

In addition, the technique can also have the following configuration.

(1) A video signal output device including:
multiple digital interface terminals to which each of multiple display devices configuring a multi-display is connected via a transmission path;
a signal output unit for outputting a video signal to each of the multiple digital interface terminals; and
a control unit for controlling replacement of the video signals output from the signal output unit to the multiple digital interface terminals.

(2) The video signal output device according to (1),
in which the control unit controls the replacement according to a video replacement operation signal sent from any of the multiple display devices via the transmission path.

(3) The video signal output device according to (2),
in which the video signals output from the signal output unit to the multiple digital interface terminals include display information for displaying which screen in a multi-screen each video signal corresponds to.

(4) The video signal output device according to (3),
in which the display information includes information for displaying at least any of colors, patterns, numbers, letters, symbols, and pictograms.

(5) The video signal output device according to any one of (2) to (4),
in which at least any of the video signals output from the signal output unit to the multiple digital interface terminals includes user interface display information for a user to perform a video replacement operation.

(6) The video signal output device according to (5),
in which the user interface display information is included in a video signal corresponding to a predetermined screen in the multi-screen that is among the video signals output from the signal output unit to the multiple digital interface terminals.

(7) The video signal output device according to any one of (2) to (6),
in which the digital interface terminals include HDMI terminals, and
the video replacement operation signal is sent via a CEC line included in the transmission path.

(8) The video signal output device according to any one of (1) to (7),
In which the control unit performs control to output the video signal corresponding to the screen configuration of the multi-display from the signal output unit according to a setting operation signal of the screen configuration of the multi-display including the multiple display devices that is sent from any of the multiple display devices via the transmission path.

(9) The video signal output device according to (8),
in which at least any of the video signals output from the signal output unit to the multiple digital interface terminals includes user interface display information for the user to perform a setting operation of the screen configuration of the multi-display including the multiple display devices.

(10) The video signal output device according to (9),
in which options of the screen configuration of the multi-display in the user interface display information are limited according to information regarding the number of display devices.

(11) A method for controlling a video signal output device,
the video signal output device including
multiple digital interface terminals to which each of multiple display devices configuring a multi-display is connected via a transmission path, and
a signal output unit for outputting a video signal to each of the multiple digital interface terminals,
in which replacement of the video signals output from the signal output unit to the multiple digital interface terminals is controlled according to a video replacement operation signal sent from any of the multiple display devices via the transmission path.

(12) A display device including:
an operation signal generation unit that generates an operation signal for replacing videos displayed on screens of multiple display devices configuring a multi-display including its own display device; and
a transmission unit that transmits the operation signal to a video signal output device that outputs a video signal to the multiple display devices via a transmission path.

(13) The display device according to (12),
in which the transmission path includes an HDMI cable, and
the operation signal is transmitted via a CEC line included in the transmission path.

(14) The display device according to (12) or (13),
in which the operation signal generation unit generates the operation signal according to a user operation referring to a user interface display displayed on any of the multiple display devices.

(15) A multi-display system,
in which a video signal output device and multiple display devices configuring a multi-display are connected to each other via a transmission path, and
the video signal output device includes:
multiple digital interface terminals to which each of the multiple display devices is connected via a transmission path,
a signal output unit for outputting a video signal to each of the multiple digital interface terminals, and
a control unit for controlling replacement of the video signals output from the signal output unit to the multiple digital interface terminals.

REFERENCE SIGNS LIST

10: Multi-display system
100: Video signal output device
101-1 to 101-4: HDMI output terminal
102: Control unit
103, 103-1 to 103-4: HDMI transmission unit
104: Signal source
105: Selection unit
200: Television receiver
201: HDMI input terminal
202: Control unit
203: HDMI reception unit 204: Signal processing unit
205: Display unit
300: HDMI cable

The invention claimed is:

1. A video signal output device, comprising:
a plurality of multiple digital interface terminals, wherein
each of the plurality of multiple digital interface terminals is connected to a multiple display device of a plurality of multiple display devices via a transmission path,
the plurality of multiple display devices transmits a plurality of video replacement operation signals, and
the plurality of multiple display devices configures a multi-display;
a signal output unit configured to output a first video signal to each of the plurality of multiple digital interface terminals; and
a control unit configured to control replacement of a plurality of the first video signals, wherein
the control unit is further configured to:
perform control to output the first video signal corresponding to a screen configuration of the multi-display based on a setting operation signal of the screen configuration of the multi-display, wherein the setting operation signal is sent from one of the plurality of multiple display devices via the transmission path,
control the replacement of the first video signals based on a video replacement operation signal of the plurality of video replacement operation signals sent from one of the plurality of multiple display devices via the transmission path,
the first video signal includes user interface display information for a user to perform a setting operation of the screen configuration of the multi-display,
a plurality of options of the screen configuration of the multi-display in the user interface display information is based on information regarding a number of display devices, and
the first video signal includes the user interface display information for the user to perform a video replacement operation.

2. The video signal output device according to claim 1, wherein the video signal further includes display information on a screen in a multi-screen each video signal corresponds to.

3. The video signal output device according to claim 2, wherein the display information includes information to display at least one of colors, patterns, numbers, letters, symbols, or pictograms.

4. The video signal output device according to claim 1, wherein
the user interface display information is included in a second video signal corresponding to a screen at a specific position in the multi-screen, and
the second video signal is among the plurality of the first video signals.

5. The video signal output device according to claim 1, wherein
the digital interface terminals include HDMI terminals, and
the video replacement operation signal is sent via a CEC line included in the transmission path.

6. A method for controlling a video signal output device, comprising:

outputting, by a signal output unit, a video signal to each of a plurality of multiple digital interface terminals of the video signal output device, wherein
each of the plurality of multiple digital interface terminals is connected to a multiple display device of a plurality of multiple display devices via a transmission path,
the plurality of multiple display devices configures a multi-display, and
the video signal includes user interface display information for a user to perform a video replacement operation;
controlling, by a control unit, replacement of a plurality of the video signals based on a video replacement operation signal sent from one of the plurality of multiple display devices via the transmission path;
performing control, by the control unit, to output the video signal corresponding to a screen configuration of the multi-display based on a setting operation signal of the screen configuration of the multi-display, wherein the setting operation signal is sent from one of the plurality of multiple display devices via the transmission path, wherein
the video signal includes the user interface display information for the user to perform a setting operation of the screen configuration of the multi-display,
a plurality of options of the screen configuration of the multi-display in the user interface display information is based on information regarding a number of display devices.

7. A display device, comprising:
an operation signal generation unit configured to generate an operation signal to replace videos displayed on each screen of a plurality of screens of a plurality of multiple display devices, wherein the plurality of multiple display device configures a multi-display including its own display device; and
a transmission unit configured to transmit the operation signal to a video signal output device that outputs a video signal to the plurality of multiple display devices via a transmission path, wherein
the video signal output device includes a signal output unit and a control unit,
the signal output unit outputs a video signal to each of a plurality of multiple digital interface terminals,
each of the plurality of multiple digital interface terminals is connected to a multiple display device of the plurality of multiple display devices via the transmission path,
the control unit controls replacement of a plurality of the first video signals and
performs control to output the video signal corresponding to a screen configuration of the multi-display based on a setting operation signal of the screen configuration of the multi-display,
the setting operation signal is sent from one of the multiple display devices via the transmission path, and
the control unit controls the replacement of the video signals based on the operation signal,
the video signal includes user interface display information for a user to perform a setting operation of the screen configuration of the multi-display,
a plurality of options of the screen configuration of the multi-display in the user interface display information is based on information regarding a number of display devices.

8. The display device according to claim 7, wherein the transmission path includes an HDMI cable, and the operation signal is transmitted via a CEC line included in the transmission path.

9. The display device according to claim 7, wherein the operation signal generation unit is further configured to generate the operation signal based on a user operation referring to a user interface display displayed on one of the plurality of multiple display devices.

10. A multi-display system, comprising:
a video signal output device and a plurality of multiple display devices configuring a multi-display, wherein the video signal output device and the plurality of multiple display devices are connected to each other via a transmission path, wherein
the video signal output device includes
a plurality of multiple digital interface terminals wherein each of the plurality of multiple digital interface terminals is connected to a multiple display device of a plurality multiple display devices via a transmission path,
the plurality of multiple display devices transmit a plurality of video replacement operation signals, and
the plurality of multiple display devices configures a multi-display;
a signal output unit configured to output a video signal to each of the plurality of multiple digital interface terminals; and
a control unit configured to control replacement of a plurality of the video signals, wherein
the control unit is further configured to:
perform control to output the video signal corresponding to a screen configuration of the multi-display based on a setting operation signal of the screen configuration of the multi-display, wherein the setting operation signal is sent from one of the multiple display devices via the transmission path,
control the replacement of the video signals based on a video replacement operation signal of the plurality of video replacement operation signals sent from one of the plurality of multiple display devices via the transmission path,
the video signal includes user interface display information for a user to perform a setting operation of the screen configuration of the multi-display,
a plurality of options of the screen configuration of the multi-display in the user interface display information is based on information regarding the number of display devices, and
the video signal includes the user interface display information for a user to perform a video replacement operation.

11. The video signal output device according to claim 1, wherein the user interface information further includes information regarding a video to be displayed on each screen of the multiple display devices.

* * * * *